US009361878B2

(12) United States Patent
Boukadakis

(10) Patent No.: US 9,361,878 B2
(45) Date of Patent: Jun. 7, 2016

(54) COMPUTER-READABLE MEDIUM, SYSTEM AND METHOD OF PROVIDING DOMAIN-SPECIFIC INFORMATION

(76) Inventor: Michael Boukadakis, Austin, TX (US)

( * ) Notice: Subject to any disclaimer, the term of this patent is extended or adjusted under 35 U.S.C. 154(b) by 80 days.

(21) Appl. No.: 13/436,478

(22) Filed: Mar. 30, 2012

(65) Prior Publication Data

US 2013/0262123 A1   Oct. 3, 2013

(51) Int. Cl.
*G10L 15/00* (2013.01)
*G06F 17/30* (2006.01)

(52) U.S. Cl.
CPC .......... *G10L 15/00* (2013.01); *G06F 17/30283* (2013.01); *G06F 17/30654* (2013.01)

(58) Field of Classification Search
CPC ................................ G10L 15/00; G10L 15/26
USPC ................................................. 704/270–275
See application file for complete search history.

(56) References Cited

U.S. PATENT DOCUMENTS

| | | | |
|---|---|---|---|
| 4,964,156 A | 10/1990 | Blair | |
| 5,025,373 A | 6/1991 | Keyser, Jr. et al. | |
| 5,050,207 A | 9/1991 | Hitchcock | |
| 5,321,840 A | 6/1994 | Ahlin et al. | |
| 5,592,538 A | 1/1997 | Kosowsky et al. | |
| 5,774,525 A * | 6/1998 | Kanevsky et al. | 379/88.02 |
| 5,822,405 A | 10/1998 | Astarabadi | |
| 5,850,429 A | 12/1998 | Joyce et al. | |
| 5,946,377 A | 8/1999 | Wolf | |
| 6,094,635 A * | 7/2000 | Scholz et al. | 704/270 |
| 6,104,787 A | 8/2000 | Paris | |
| 6,161,090 A * | 12/2000 | Kanevsky et al. | 704/246 |
| 6,246,981 B1 * | 6/2001 | Papineni et al. | 704/235 |
| 6,314,402 B1 * | 11/2001 | Monaco et al. | 704/275 |
| 6,356,868 B1 * | 3/2002 | Yuschik et al. | 704/246 |
| 6,385,202 B1 | 5/2002 | Katseff et al. | |
| 6,594,484 B1 | 7/2003 | Hitchings, Jr. | |
| 6,823,054 B1 * | 11/2004 | Suhm et al. | 379/134 |
| 7,133,687 B1 | 11/2006 | El-Fishawy et al. | |
| 7,194,414 B1 * | 3/2007 | Savage et al. | 705/64 |
| 7,219,136 B1 * | 5/2007 | Danner et al. | 709/219 |
| 7,356,475 B2 | 4/2008 | Novack et al. | |
| 7,403,788 B2 | 7/2008 | Trioano et al. | |
| 7,593,396 B2 | 9/2009 | Bhandari et al. | |

(Continued)

OTHER PUBLICATIONS

Patnaik, Somani; Brunskill, Emma; and Thies, William; "Evaluating the Accuracy of Data Collection on Mobile Phones: A Study of Forms, SMS, and Voice"; 2009 International Conference on Information and Communication Technologies and Development (ICTD), Apr. 17-19, 2009; pp. 74-84.

*Primary Examiner* — Douglas Godbold
(74) *Attorney, Agent, or Firm* — Cesari & Reed LLP; R. Michael Reed

(57) ABSTRACT

A computer readable storage medium embodies instructions that, when executed by a processor, cause the processor to perform a method including receiving a natural language request corresponding to an audio input associated with a user. The computer-readable storage medium further embodies instructions that, when executed, cause the processor to retrieve account information associated with the user from a domain-specific data source through a network based on the natural language request using an application configurable retrieve account data from selected ones of a plurality of domain-specific data sources, process the account information based on the natural language request to produce output information, and provide the output information to an output interface.

20 Claims, 4 Drawing Sheets

(56) References Cited

U.S. PATENT DOCUMENTS

| | | | |
|---|---|---|---|
| 7,653,183 B2 | 1/2010 | Patel et al. | |
| 7,986,773 B2 | 7/2011 | Kalahasti et al. | |
| 8,175,230 B2* | 5/2012 | Bangalore et al. | 379/88.17 |
| 8,223,931 B1* | 7/2012 | Lavian et al. | 379/88.13 |
| RE44,326 E* | 6/2013 | Calderone et al. | 715/728 |
| 8,457,966 B2* | 6/2013 | Sannerud | 704/251 |
| 8,494,854 B2* | 7/2013 | Gross | 704/246 |
| 8,521,536 B1* | 8/2013 | Fox | 704/270.1 |
| 8,630,859 B2* | 1/2014 | DiFabbrizio et al. | 704/275 |
| 2001/0056349 A1* | 12/2001 | St. John | 704/270 |
| 2002/0035474 A1* | 3/2002 | Alpdemir | 704/270 |
| 2002/0143551 A1* | 10/2002 | Sharma et al. | 704/270.1 |
| 2005/0267748 A1 | 12/2005 | Wilkes et al. | |
| 2007/0165795 A1 | 7/2007 | Haynor | |
| 2007/0263796 A1 | 11/2007 | Patel et al. | |
| 2010/0172479 A1 | 7/2010 | Lynch et al. | |
| 2010/0172480 A1 | 7/2010 | Lynch et al. | |
| 2010/0312547 A1* | 12/2010 | Van Os et al. | 704/9 |
| 2011/0123004 A1 | 5/2011 | Chang et al. | |
| 2011/0158392 A1 | 6/2011 | DeLuca | |
| 2011/0238414 A1* | 9/2011 | Ju et al. | 704/201 |
| 2013/0080177 A1* | 3/2013 | Chen | 704/275 |

* cited by examiner

COMPUTER-READABLE MEDIUM, SYSTEM AND METHOD OF PROVIDING DOMAIN-SPECIFIC INFORMATION

FIELD

The present disclosure is generally related to speech-based systems, and more particularly, to systems configured to perform complex inquiry processing based on speech-based inputs.

BACKGROUND

Conventionally, interactive voice response systems allow users to access financial data (such as credit card information associated with a particular credit card company, bank account data associated with a particular bank, etc.), enterprise phone directories, help desk information, and so on. Such systems are generally configured to assist a user to achieve a pre-defined goal in a particular domain. Such systems are domain specific in that they allow the user to retrieve pre-defined categories of information related to a particular business entity, such as a balance of minutes associated with a cellular phone subscriber account or a credit balance associated with a particular user's credit card account. These type of interactive voice response systems are enterprise specific (domain-specific).

In recent years, many corporations implemented secure web site access to allow users to access account information through a secure socket layer connection over the Internet. With respect to a credit card company for example, such connections can be accessed by a user to view recent transaction information, available credit, usage data, and so on. Typically, such information is accessed by a user through an Internet browser application executing on a computing device, such as a smart phone, a portable computing device (laptop, tablet computer, etc.), or other computing device configured to execute processor-readable instructions.

Recently, Apple Inc. of Cupertino, Calif. has introduced a Siri® software application that operates on the Apple iPhone®. Siri® stands for "Speech Interpretation and Recognition Interface" and is a software application that is designed to be an intelligent personal assistant and knowledge navigator. Siri® uses a natural language user interface to answer questions, make recommendations, and perform actions by delegating requests to a set of web services.

SUMMARY

In an embodiment, a computer readable medium embodies instructions that, when executed by a processor, cause the processor to retrieve domain-specific data. The instructions, when executed, cause the processor to perform a method including receiving text corresponding to a natural language request from a device associated with a user, retrieving account data corresponding to the user based on the text, and determining a query based on the text and a domain based on the account data. The instructions further cause the processor to retrieve data from the domain using the query and the account data and to provide at least some of the data to the device.

In another embodiment, a system includes an output interface, a transceiver configured to communicate with a network, a processor coupled to the transceiver and to the output interface, and a memory coupled to the processor. The memory is configured to store instructions that, when executed by the processor, cause the processor to convert an audio input into text, determine a query for a particular domain from a plurality of domains based on the text, and determine authentication information for the particular domain in response to determining the query. The memory is further configured to store instructions that, when executed, cause the processor to transmit the query and the authentication information to the particular domain through the network to retrieve data corresponding to the text from the particular domain and to provide at least a portion of the data to the output interface.

In still another embodiment, a method includes receiving text corresponding to a natural language request from a device associated with a user and retrieving account data corresponding to the user based on the text. The method further includes determining a domain from a plurality of domains based on the account data and a query from a plurality of queries based on the text, retrieving data from the domain using the query and the account data, and providing at least some of the data to the device.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of systems, computing devices, and methods are described below that are configured to allow a user to interact with multiple domain-specific systems (i.e. systems associated with a particular enterprise, such as a particular credit card or bank system) to retrieve account information without having to dial in to an interactive voice response server and without having to visit a website. In an example, the computing device is configured to receive a voice request and to retrieve account information from one or more domain-specific accounts in response to the voice request.

In one example, a server is provided that is configured to store information related to the user's financial accounts, such as credit card accounts, bank accounts, and the like, providing a one-stop location for the user to retrieve account information from various accounts associated with different companies. For example, the server is configured to receive a request from a portable device associated with the user, to determine account information associated with the user based on a received request, to retrieve data associated with the user's account, optionally to process the data, and then to transmit the data to the user's device.

In a particular example, the user can turn on his smart phone and ask the phone for his last five credit card transactions for a specific credit card. The smart phone converts the speech into text and accesses an application that is configured to send a request related to the text to the server. In response to the request, the server determines the user's account information and communicates with a domain-specific system associated with the specific credit card to retrieve the transaction data. In some instances, the server processes the transaction data to extract the specific information based on the request and returns the specific information to the user's smart phone. In other instances, the server returns the transaction data to the smart phone and the smart phone processes the transaction data to extract the specific information using the application. The smart phone can then provide the specific information to the user, either through the display or audibly by converting the specific information to an audio signal (text-to-speech) for reproduction through a speaker of the smart phone.

In some instances, the smart phone may store user account data including instructions executable by a processor of the smart phone to access domain-specific account information in a local memory and to communicate with a domain-specific server to retrieve account information, such as (for example) a last five credit card transactions for a particular credit card. The smart phone may then present the account information to the user through a display or through a speaker. One example of a system to provide domain-specific information is described below with respect to FIG. 1.

Figure 1:
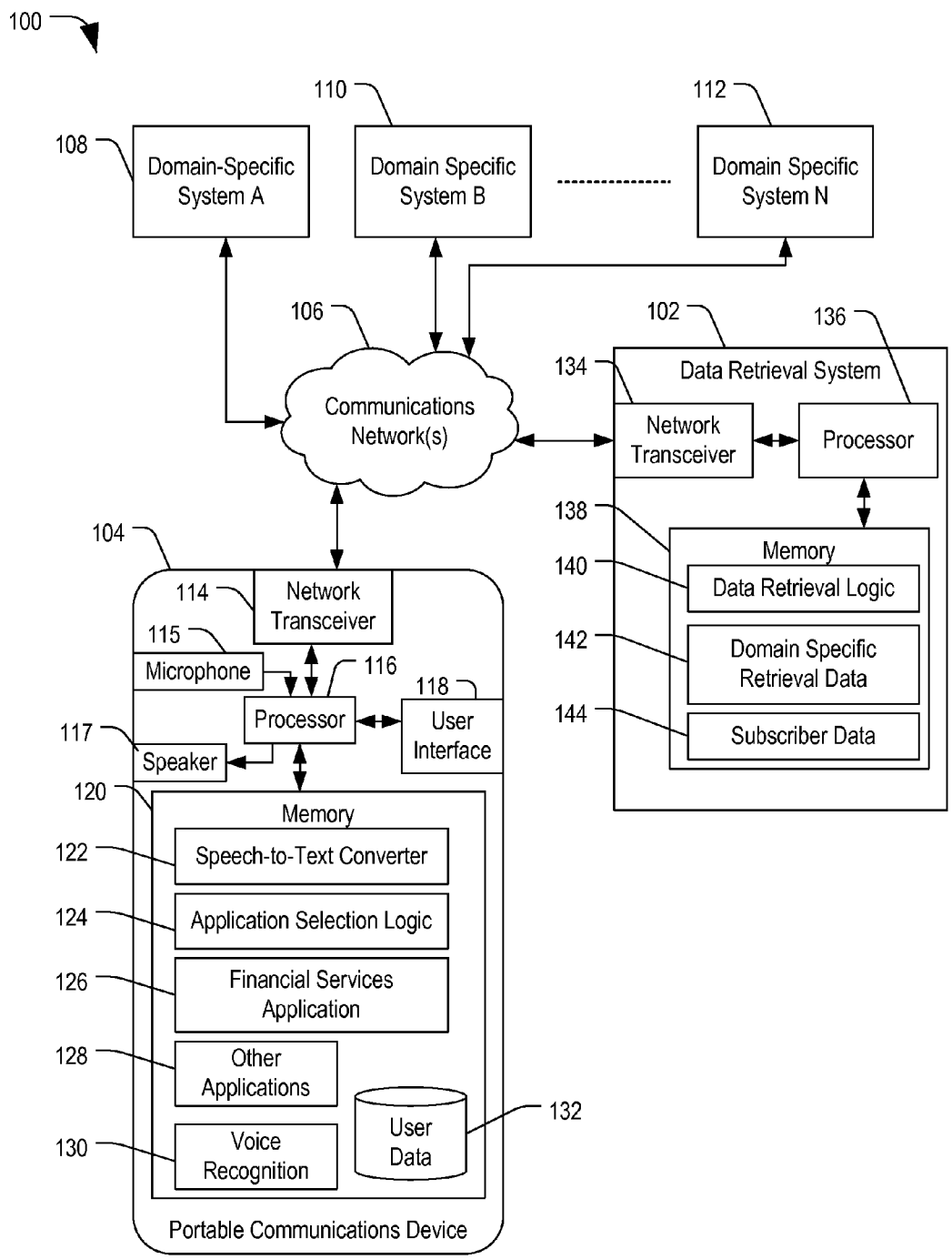
FIG. 1 is a block diagram of an embodiment of a system configured to provide domain-specific information.

FIG. 1 is a block diagram of an embodiment of a system 100 configured to provide domain-specific information. System 100 includes a data retrieval system 102 coupled to a portable communications device 104 and to one or more domain-specific systems 108, 110, and 112 through a communications network 106. Portable communications device 104 can be a laptop or tablet computer, a smart phone, a personal digital assistant, or some other computing device.

Portable communications device 104 includes a network transceiver 114 configured to communicate with communications network 106. Portable communications device 104 further includes a processor 116 coupled to network transceiver 114, to a user interface 118 (such as a keypad, display, or touch screen interface), and to a memory 120. Additionally, portable communications device 104 includes a microphone 115 coupled to processor 116 to provide a signal related to an audio input. In an example, the microphone 115 includes an analog-to-digital converter. In another example, portable communications device 104 includes an analog-to-digital converter between microphone 115 and processor 116. Additionally, portable communications device 104 includes a speaker 117 coupled to processor 116 and configured to produce an audible output.

Memory 120 stores speech-to-text converter instructions 122 that, when executed, cause processor 116 to convert audio data from microphone 115 into a natural language text input. Memory 120 also stores application selection logic 124 that, when executed, causes processor 116 to select an application based on the natural language text input. In one example, speech-to-text converter instructions 122 and application selection logic 124 may be implemented by a single application. In a particular example, portable communications device 104 can be an iPhone® executing Siri® by Apple Inc. of Cupertino, Calif. In this particular instance, Siri® would operate to convert the spoken request, to select the financial services application 126 in response to the spoken request, and to present the account data results to the user.

Memory 120 further includes a financial services application 126 and other applications 128. Memory 120 also includes voice recognition software 130 that can be executed by the processor 116 to authenticate the voice pattern of a particular user. Financial services application 126, when selected by application selection logic 124 and executed by processor 116, causes processor 116 to access user data 132 (for example, to retrieve account login information, such as account number and password data associated with a subscriber account of data retrieval system 102) and to communicate a request including at least a portion of the user data 132 to data retrieval system 102.

Data retrieval system 102 includes a network transceiver 134 configured to couple to communications network 106. Data retrieval system 102 further includes a processor 136 coupled to network transceiver 134 and to a memory 138. Memory 138 includes data retrieval logic 140 that, when executed, causes processor 136 to receive the request, to retrieve subscriber data 144 associated with the user in response to receiving the request, and to retrieve domain-specific retrieval data 142 based on the request. Subscriber data 144 may include account login information for a plurality of account holders as well as subscriber login data for the particular user to login to data retrieval system 102. In a particular example, subscribers may login and register one or more accounts with data retrieval system 102, configuring his/her subscriber account with data retrieval system and populating subscriber specific account information stored in subscriber data 144. Such account data can include account numbers, domain-specific information, login information (such as password or pin data), and other information for accessing the particular domain-specific system 108, 110, or 112.

Domain-specific retrieval data 142 may include an address for accessing a particular domain-specific system 108 (such as a uniform resource locator (URL), an Internet Protocol (IP) address, or some other address. Domain specific retrieval data 142 may also include data needed to authenticate a user to the domain-specific system 108 and/or to navigate particular selection options in order to retrieve the account data associated with the request. Subscriber data 144 includes account information associated with multiple subscribers. For a particular subscriber, subscriber data 144 includes account information for each account registered by a particular subscriber, the account number, the financial institution that holds the account, and authentication information (e.g., username, password, pin, or other authentication information).

Data retrieval logic 140, when executed, further causes processor 136 to retrieve account data from one of domain-specific systems 108, 110, and 112 using the subscriber data 144 and the domain-specific retrieval data 142. Data retrieval logic 140 causes processor 136 to access the records of one of the domain-specific systems 108, 110 or 112 associated with the user to gather account data. In an example, data retrieval logic 140 may cause processor 136 to scrape account data from a web page of a particular domain-specific system. Further, data retrieval logic 140, when executed by processor 136, can optionally cause processor 136 to extract specific information from the retrieved data according to the request and to transmit the specific information to portable communications device 104 through network 106. Otherwise, data retrieval logic 140 causes processor 136 to provide the retrieved account data to portable communications device 104.

In general, system 100 enables the user to access his/her financial account information using portable communications device 104, which can communicate with data retrieval system 102 to acquire the data and which can communicate the data to the user in a suitable format (i.e., audible output or visual display). In a particular example, the user speaks a request for account information associated with one of the domain-specific systems 108, 110, and 112. One example of a request could be "What were my last five deposits in my checking account?" Another example could be "Tell me my four visa transactions."

In response to the spoken request, portable communications device 104 uses speech-to-text converter 122 to convert the spoken request to text and accesses application selection logic 124 to determine which application to use based on the text. If the spoken request involves accessing an account of a domain-specific system (such as a credit card, bank, or some other enterprise), application selection logic 124 accesses financial services application 126, which accesses user data 132 to retrieve login information associated with data retrieval system 102 and possibly data identifying the type of account or related information. Processor 116 uses financial services application 126 to generate a request, which includes the login information for data retrieval system 102 from user data 132 and which includes data related to the text derived from the spoken request, and to send the request to data retrieval system 102.

Data retrieval system 102 receives the request from portable communications device 104. In response to the request, data retrieval system 102 authenticates the login information from the request and accesses the subscriber data 144 based on the login information. Further, data retrieval system 102 uses data retrieval logic 140 to determine domain specific retrieval data 142 and account data from subscriber data 144 in order to access the particular domain-specific system 108, 110, or 112 based on the request. In an example, data retrieval system 102 may uses data from subscriber data 144 and from domain specific retrieval logic 142 to access domain-specific system 108 to retrieve account data associated with the subscriber, to scrape the account data, to generate an output including at least a portion of the account data, and to send the output to portable communications device 104.

Portable communications device 104 receives the output from data retrieval system 102. In response to receiving the output, portable communications device 104 may present the output as text to a display portion of user interface 118. Alternatively, processor 116 may execute instructions (not shown) to convert the output into an audible output for reproduction by speaker 117. Thus, the user can speak to the portable communications device and, in response to the spoken request, receive account specific information from one or more domain-specific systems.

It should be understood that the domain-specific systems 108, 110, and 112 may be accessed differently from one another, both in terms of the login process and in terms of how to retrieve the data after a successful login. Accordingly, domain specific retrieval data 142 includes data related to the retrieval process for each specific account.

While the above-example uses a data retrieval system 102 to access particular domain-specific systems 108, 110, and 112, in an alternative embodiment, portable communications device 104 can be configured to communicate directly with domain-specific systems 108, 110, and/or 112. One possible implementation of such a system is described below with respect to FIG. 2.

Figure 2:
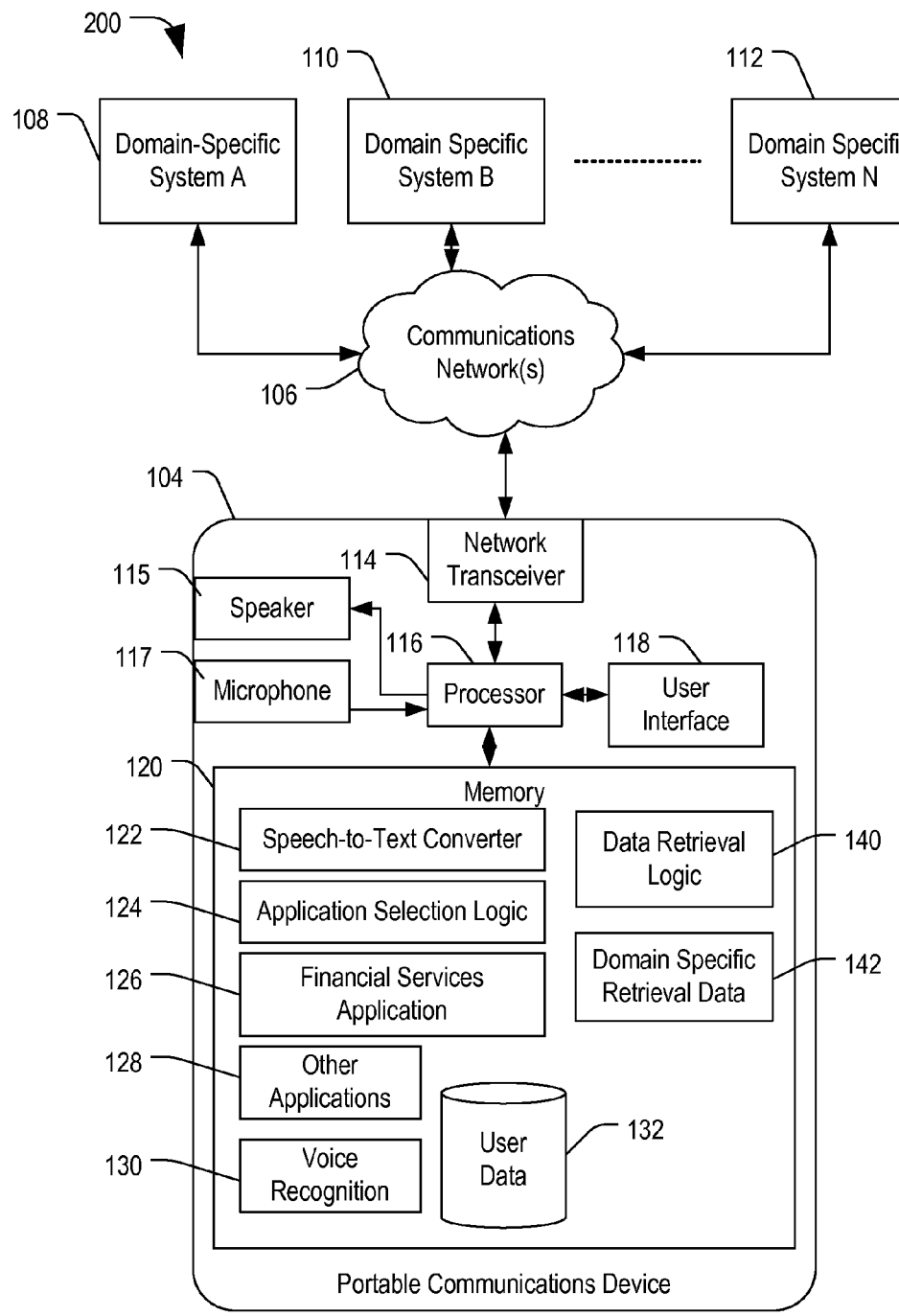
FIG. 2 is a block diagram of a second embodiment of a system configured to provide domain-specific information.

FIG. 2 is a block diagram of a second embodiment of a system 200 configured to provide domain-specific information. In this example, system 200 includes all of the elements of system 100 in FIG. 1, except that data retrieval system 102 is omitted, and data retrieval logic 140 and domain-specific retrieval data 142 are moved from the memory of data retrieval system 102 to the memory 120 of portable communication device 104.

In this instance, data retrieval logic 140 and domain-specific retrieval data 142 are utilized by processor 116 to access a selected one of the domain-specific systems 108, 110, and 112 based on the output of the speech-to-text converter application 122. In particular, the user can provide a spoken request to portable communications device 104, which is converted into text and which is used by financial services application 126, in conjunction with domain specific retrieval data 142 and data retrieval logic 140 to retrieve domain-specific information corresponding to a user account from one of the domain-specific systems 108, 110, and 112.

In this instance, user data 132, instead of including subscriber login data, may include account information, pin numbers, credentials, passwords, and other data that may be used to login to the domain-specific systems 108, 110, and 112. In this instance, financial services application 126 and data retrieval logic 140 are used to identify the appropriate account information to access the particular domain-specific system. In this instance, processor 116 of portable communications device 104 executes data retrieval logic 140, retrieves the data, processes, and presents the data to the user.

Regardless of how portable communications device 104 receives the account information, portable communications device 104 may further process the account information to extract data corresponding to the spoken request. If the user asks for three transactions, portable communications device 104 can process the account information to provide an output having the three transactions.

While the above-examples described systems for providing domain-specific information to the user, other systems may also be used. Further, though the speech-to-text converter application 122 is depicted as software stored in memory, the converter may alternatively be implemented as hardware and/or as a field programmable gate array (depending on the implementation). Further, one possible implementation out of many possible implementations of a method of providing domain-specific information is described below with respect to FIG. 3.

Figure 3:
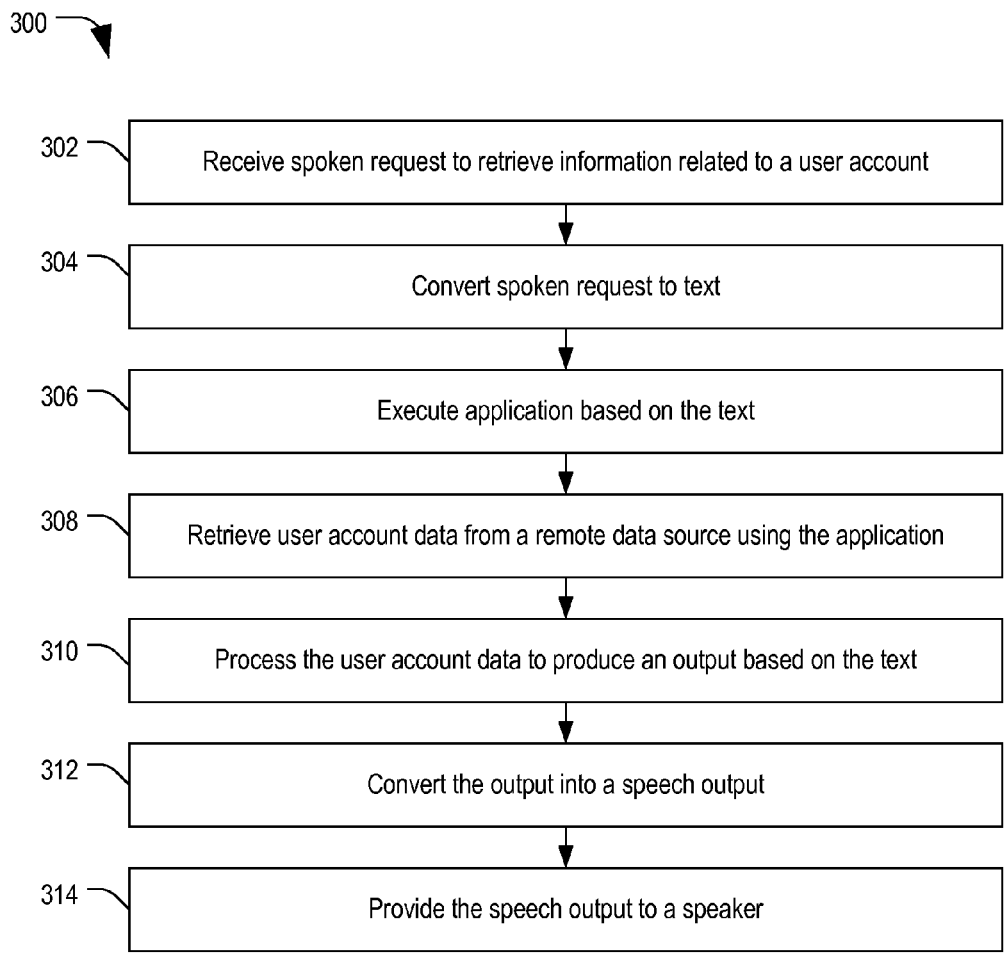
FIG. 3 is a flow diagram of an embodiment of a method of providing domain-specific information using a portable computing device, such as a smart phone.

FIG. 3 is a flow diagram of an embodiment of a method 300 of providing domain-specific information using a portable computing device, such as a smart phone. At 302, a spoken request is received to retrieve information related to a user account. For example, the user may speak the following query: "What are my last five Citibank® transactions." Portable communications device 104 may treat this question as a request. Advancing to 304, portable communications device 104 converts the spoken request into text. Continuing to 306, portable communications device 104 executes an application based on the text. For example, the application may be a financial services application.

Moving to 308, portable communications device 104 retrieves user account data from a remote data source using the application. Proceeding to 310, portable communications device 104 processes the user account data to produce an output based on the test. In this example, the user specified the last five Citibank® transactions, so portable communications device 104 processes the user account data to extract the last five Citibank® transactions to produce the output. Continuing to 312, portable communications device 104 converts the output into a speech output. Advancing to 314, portable communications device 104 provides the speech output to a speaker for reproduction as an audible output signal. In an alternative example, portable communications device 104 can provide the output to a display as text, graphics or both.

Method 300 represents one possible example a process for providing domain-specific information to the user; however, other methods are also possible. For example, blocks 212 and 214 may be omitted and the output may be provided to a display, such a user interface 118, instead. Further, while in the above-example, the information is retrieved and provide by portable communications device 104, it should be appreciated that at least some of the processes may be performed by a server in communication with portable communications device 104. An example of a method of providing domain-specific information to the user from the perspective of a server (such as data retrieval system 102 in FIG. 1) in communication with the portable communications device 104 is described below with respect to FIG. 4.

Figure 4:
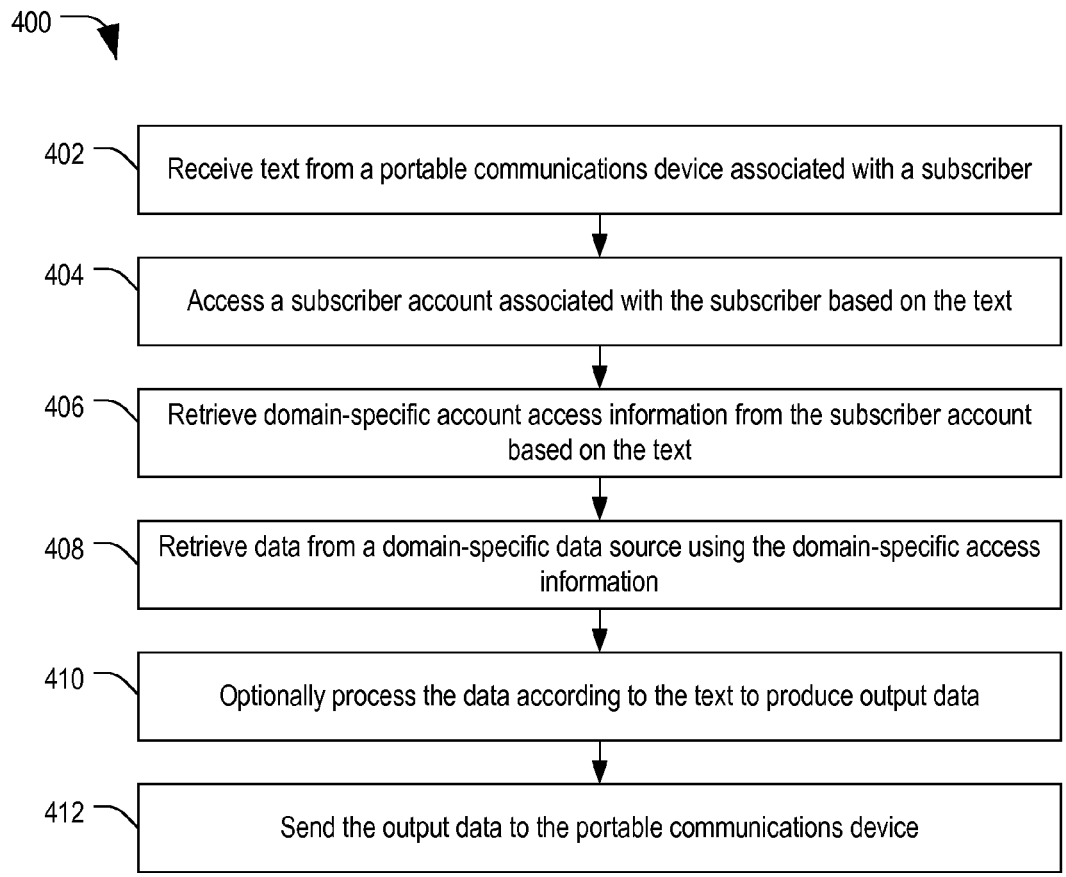
FIG. 4 is a flow diagram of a second embodiment of a method of providing domain-specific information using a server configured to communicate with a portable computing device, such as a smart phone.

FIG. 4 is a flow diagram of a second embodiment of a method 400 of providing domain-specific information using a server 102 configured to communicate with a portable computing device, such as a smart phone. At 402, the server 102 receives a request from a portable computing device (such as portable communications device 104 in FIGS. 1 and 2). Advancing to 404, the server 102 accesses a subscriber account associated with the subscriber based on the request. The subscriber account data is stored in a memory of server 102.

Continuing to 406, the server 102 retrieves domain-specific account information from the subscriber account based on the text. The domain-specific account information includes login information that can be used to access the user's account within the domain-specific system. Moving to 408, the server 102 retrieves data from a domain-specific data source using the domain-specific access information. In an example, the domain-specific access information includes login and/or access information that allows server 102 to interact with and access the user's account data associated with the domain-specific access information.

Advancing to 410, server 102 optionally processes the retrieved data according to the text to produce output data. The output data can include an extracted portion of the retrieved data. Proceeding to 412, server 102 sends the output data to the portable computing device 104.

In the example of FIG. 4, the server receives text from the portable communications device; however, in some instances the portable communications device 104 communicates the audio data to server 102, which may be configured to convert the audio data into text and then to proceed with block 404 of method 400. While method 400 is one possible example, various steps of method 400 may be altered or omitted. In a particular example, the text may include the subscriber account information and block 406 may be omitted. Additionally, in some instances, block 410 may be omitted.

In conjunction with the systems and methods of FIGS. 1-4, a system is disclosed that includes a portable communications device, such as a smart phone, and at least one domain-specific data source (such as a server of a credit card company, a bank, or another enterprise). The portable communications device is configured to receive a user request corresponding to a natural language request (or text input) and to communicate with one or more domain-specific data sources to retrieve data corresponding to the user query. The portable communications device can further process the data to provide an output corresponding to the user request.

Although the present invention has been described with reference to preferred embodiments, workers skilled in the art will recognize that changes may be made in form and detail without departing from the scope of the invention.

What is claimed is:

1. A computer readable storage device embodying instructions that, when executed by a processor of a portable communications device, cause the processor to perform a method comprising:

receiving a natural language request corresponding to an audio input associated with a user;

automatically selecting an application from a plurality of applications based on the natural language request, the selected application configured to retrieve the account information from selected ones of a plurality of domain-specific data sources;

retrieving account information associated with the user from a domain-specific data source of the plurality of domain-specific data sources through a network based on the natural language request;

filtering the account information based on the natural language request to produce output information, the output information including a portion of the account information according to the natural language request; and providing the output information to an output interface.

2. The computer readable storage device of claim 1, wherein:

the computer readable storage medium further embodies instructions that, when executed by the processor, cause the processor to convert the output information to an audible output; and the output interface comprises one of a speaker and an audio output terminal configurable to reproduce the audible output.

3. The computer readable storage device of claim 1, wherein the computer readable storage medium further embodies instructions that, when executed by the processor, cause the processor to convert the audio input into the natural language request.

4. The computer readable storage device of claim 1, wherein the instructions that cause the processor to communicate with the domain-specific data source include instructions that, when executed, cause the processor to:

present credentials to the domain-specific data source to login; and retrieve the account information from the domain-specific data source.

5. The computer readable storage device of claim 1, wherein the instructions that cause the processor to communicate with the domain-specific data source include instructions that, when executed, cause the processor to:

transmit the natural language request and user-specific authentication data to a server configured to communicate with the domain-specific data source; and receive the account information associated with the user from the server.

6. The computer readable storage device of claim 1, further including instructions that, when executed, cause the processor to extract data from the account information to produce the output information.

7. The computer readable storage device of claim 6, wherein the data includes a listing of a number of recent transactions associated with the user.

8. The computer readable storage device of claim 7, wherein the number is specified in the natural language request corresponding to the natural language request.

9. A portable communications device comprising:

a microphone configured to convert sounds into an audio signal;

a speaker;

a processor coupled to the microphone and the speaker; and a memory coupled to the processor, the memory comprising instructions that, when executed by the processor, cause the processor to:

convert an audio signal into a natural language request;

automatically select an application from a plurality of applications based on the natural language request, the application configured to communicate with a plurality of domain-specific data sources;

retrieve financial account data from a selected one of the plurality of domain-specific data sources using the application;

process the financial account data according to a portion of the natural language request to produce output data corresponding to the portion; and provide audio data to the speaker based on the output data.

10. The portable communications device of claim 9, further comprising:

a transceiver coupled to the processor and configured to couple to a communications network, and wherein the processor executes instructions to retrieve the financial account data through the communications network.

11. The portable communications device of claim 10, wherein the instructions that cause the processor to retrieve financial account data from a selected one of the plurality of domain-specific data sources include instructions that, when executed, cause the processor to:

transmit the natural language request and user-specific authentication data to a server configured to communicate with the domain-specific data source using the transceiver; and receive the financial account information associated with the user from the server.

12. The portable communications device of claim 9, further including instructions that, when executed, cause the processor to process the financial account information based on the natural language request to produce output information.

13. The portable communications device of claim 12, wherein the output information includes a listing of a number of recent transactions associated with the user.

14. The portable communications device of claim 13 wherein the number is specified in the natural language request corresponding to the natural language request.

15. The portable communications device of claim 9, wherein the portable communications device comprises at least one of a smart phone, a tablet computer, a laptop computer, and a personal digital assistant.

16. A method comprising:

receiving a natural language request corresponding to an audio input from a user at a portable communications device;

automatically selecting an application from a plurality of applications stored in a memory of the portable communications device based on the natural language request, the application configured to communicate with a plurality of domain-specific data sources;

retrieving financial account data from a domain-specific data source of the plurality of domain-specific data sources through a network in response to the natural language request using the application executing on the portable communications device;

determining at least a portion of the financial account data corresponding to the natural language request; and providing at least the portion of the financial account data to an output interface of the portable communications device.

17. The method of claim 16, wherein retrieving the financial account data comprises:

determining a query based on the natural language request, the query including data related to the natural language request;

transmitting the query from the portable communications device to a computing device through a network; and receiving the financial account data from the server in response to transmitting the query.

18. The method of claim 16, wherein retrieving the financial account data comprises:

determining a query based on the natural language request, the query formatted for the domain-specific data source; and accessing the domain-specific data source using the query to retrieve the financial account data.

19. The method of claim 16, wherein providing the at least a portion of the financial account data comprises:

selecting a portion of the financial account data;

formatting the selected portion; and providing the selected portion to an output interface; and wherein the output interface comprises a speaker.

20. The method of claim 16, wherein the portable communications device comprises at least one of a smart phone, a tablet computer, a laptop computer, and a personal digital assistant.

* * * * *